March 24, 1942.    K. F. HAINES    2,277,098
ELECTRICAL CIRCUIT
Filed July 18, 1938
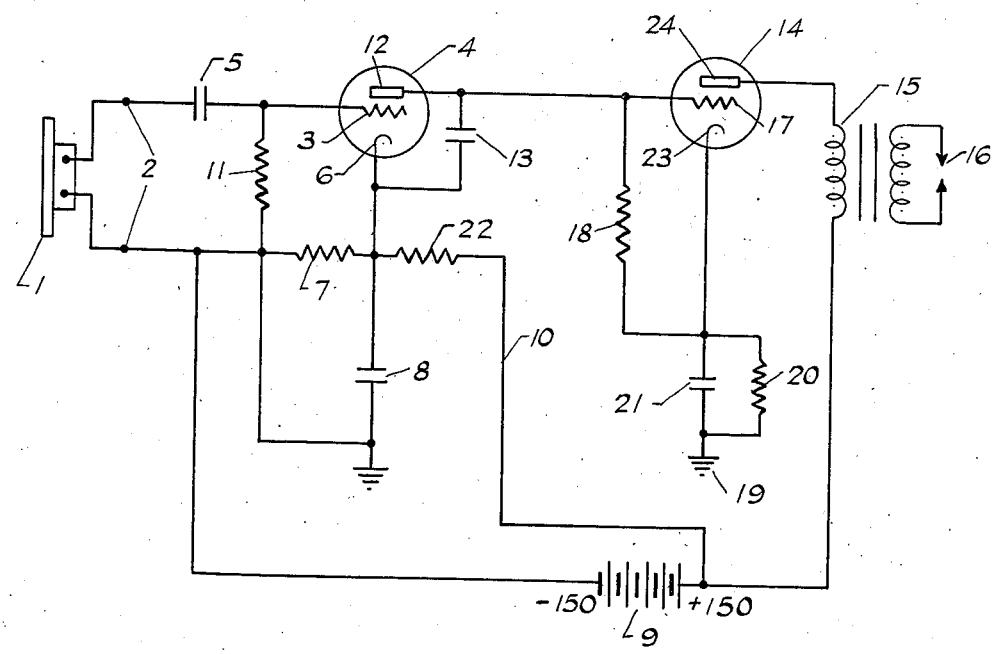
INVENTOR.
KENNETH F. HAINES
BY
his ATTORNEY.

Patented Mar. 24, 1942

2,277,098

UNITED STATES PATENT OFFICE 2,277,098

ELECTRICAL CIRCUIT

Kenneth Frederick Haines, West Newton, Mass., assignor to Submarine Signal Company, Boston, Mass., a corporation of Maine Application July 18, 1938, Serial No. 219,856

3 Claims. (Cl. 250—27)

The present invention relates to an electrical circuit particularly for use in operating an indicating device from a signal through an acoustical or electrical pickup unit, although conceivably the circuit may be used as a relay system for producing a rapid operation of an indicator, relay or other device through an impulse or signal of very short duration and weak power with extremely rapid action.

The present device is particularly useful in distance measuring apparatus where the distance is measured by means of establishing the time interval between a signal sent out at the beginning of the time interval to be measured and the return signal reflected from the object whose distance is to be determined.

In systems of this nature it is common to use an indicating device which is either in continuous rotation or which commences to rotate at the instant the time-measuring signal is emitted. If the indicating device is in continuous rotation, it is necessary, of course, to synchronize the moment of the sending out of the signal with the moment that the indicating device departs from the zero mark of the indicator.

The system according to the present invention as applied to distance measuring in the manner described above relates only to the circuit for transfering the signal received to the indicating device. In this system it has been common practice to employ circuits having thermionic vacuum tubes in which control grids have their voltages changed to produce an operation of an indicating device from a signal picked up by a microphone or other acoustical electrical unit. In most of these systems the final element to operate the indicator is to some extent variably operated dependent upon the intensity of the original signal and its endurance, that is to say, a weak initial signal for the most part does not produce as positive a response as a strong signal, and, further, some variation might occur in the time element of the operation of the circuit.

These difficulties are overcome by the present invention and in addition the circuit has other advantages over prior types of circuit. The present circuit is capable of operating on both direct current and alternating current impulses of a great varying frequency range. Further, the circuit in the present invention is characteristically simple and operates the indicating device with the same intensity, whether the signal is weak or strong or short or long.

Other advantages and merits of the circuit in the present invention will be more clearly understood from the description given below in connection with the drawing.

In the drawing the signal is impressed upon the system by means of the pickup unit 1 connected across the input terminals 2, one end of which is connected through a condenser 5 to the grid 3 of the gaseous rectifier tube 4, the other terminal of which is connected to the cathode 6 of the same tube through a series connected shunt comprising the resistance 7 and the capacity 8. In place of the resistance 7 and capacity 8, where large currents are necessary, this potential drop may be obtained by the substitution of a battery. A minus potential is placed upon the cathode 6 through this series connection by means of the electrical source 9 which may be a battery, power pack or other suitable direct-current source. The grid 3 is also provided with a grid leak 11 connected to the cathode lead at the negative battery connection. The plate 12 of the gaseous or rectifier tube 4, as it may be called, is connected to the cathode through the small condenser 13. This condenser together with the resistance 18, which is described just below, are selected with regard to their value to produce the necessary time constant so that after the signal is received, the circuit will quickly return to its normal inoperative state.

In connection with the circuit thus described there is a triode vacuum tube 14 which controls through the choke or transformer 15 the operation of the discharge indicator 16. The grid 17 of this triode is connected to the plate 12 of the previous gaseous tube and both of these elements are grounded through a resistor 18 to the ground 19 through the series-connected shunt circuit comprising the resistance 20 and the capacity 21. The cathode 6 of the gaseous tube 4 is connected to the positive side of the battery 9 or other voltage source by means of the lead 10 through the resistor 22.

In the normal state of the system, current flows in the vacuum tube 14 between the cathode 23 and the anode 24 which have a potential difference established by the battery potential 9 and resistor 20, the anode being positive with respect to the cathode by approximately the voltage of the power source. The flow of anode-cathode current establishes the potential of the grid 17 which in normal inoperative state is at the same potential as the cathode 23, the potential of which is established above ground by means of the resistor 20. Normally the potential established on the grid 17 is half of the potential between the cathode and anode. This same potential is, of course, also established on the plate 12 of the gaseous tube. The voltage on the cathode 6 is supplied through the series connection of the shunt elements 7 and 8 and under normal conditions is approximately at the voltage of the low side of the system but of such polarity and magnitude that normally the tube will just be prevented from breaking down. The voltage from the cathode 6 to the anode 12 is set for normal conditions so that the tube 4 will be at a point where no ionization of the gas takes place so that the resistance to the flow of current is very large but just at the point where a slight increase of potential will cause an ionization of the tube. When the impulse is impressed across the input 2, the grid 3 goes slightly positive, furnishing the change in conditions, sufficient to cause an ionization of the gaseous tube 4 and a breakdown of the resistance of the tube. When this breakdown occurs, the resistance of the tube drops from a value that is substantially very large in the neighborhood of megohms to (approximately) zero and immediately allows the discharge of the condenser 13 which has previously assumed the voltage of the potential drop from the plate or anode 12 to the cathode 6 of the gaseous tube in its initial normal state. The discharge of the condenser 13 across the gaseous tube 4 supplies the energy for complete reduction of the resistance of the tube 4 and therefore simultaneously therewith reduces the potential on the plate 12 of the first tube and the grid 17 of the second tube by a substantial voltage. The tube 14 is so chosen that this reduction in voltage which occurs very rapidly in a time controlled by the time constant of the condenser 13 sends the cathode-anode current in the tube 14 down to the cut-off point. The rate of change of current during this interval produces a voltage in the primary of the transformer 15 or marking relay which if necessary may be stepped up into the secondary for the purpose of operating the indicator tube 16 which may be a neon tube or a tube of other similar gas which becomes ionized and breaks down upon sudden voltage applied thereto, producing an indication of red light or other suitable color, depending upon the gas that is used.

It will be noted in the system just described that any change sufficient to cause the discharge of the condenser 13 in the tube 4 will produce an operation of the system and that if such change is not sufficient, the system will not operate so that whether the initial signal is of great or weak intensity, if an operation of the system occurs at all, it will occur always in the same fashion. The recovery of the normal conditions in the first tube occurs through the charging of the condenser 13 by current flowing through the resistor 18. This current which initially is large decreases to zero as the condenser 13 becomes charged and its potential is raised to a steady state value which is the maximum it reaches.

It will also be noted that the circuit itself is quite independent of frequency variations and might be operated upon a direct current impulse as well as oscillatory current. The time of operation for successive signals is controlled entirely by the time of recovery of the initial circuit which is dependent upon the characteristics of the tube 4 and the time constant of the condenser 13 and resistor 18. This may be made of such a short duration that the circuit will recover in time intervals of from $10^{-4}$ to $10^{-5}$ of a second and sufficiently short for most useful purposes in distance measuring apparatus where sound waves are employed.

Having now described my invention, I claim:

1. An impulse repeating circuit comprising, in combination, a gaseous tube and a vacuum tube each having cathode, anode and grid electrodes and circuits associated therewith including means connecting the anode of the gaseous tube to the grid of the vacuum tube, a condenser connected directly between the cathode and anode of the gaseous tube, means for establishing normal steady anode-cathode current through said vacuum tube, means including part of said last-named means for charging said condenser by said vacuum tube current, means for impressing a signal impulse upon the cathode grid circuit of the gaseous tube whereby the resistance of its anode-cathode circuit is reduced substantially to zero producing discharge of the condenser and consequent lowering of the potential of the grid of the vacuum tube to cut off the anode-cathode current of the vacuum tube, means responsive to rapid change in said vacuum tube current for producing an impulse and means for restoring said normal vacuum tube current and thereby recharging said condenser.

2. An impulse repeating circuit comprising, in combination, a gaseous tube and a vacuum tube each having cathode, anode and grid electrodes and circuits associated therewith including means directly connecting the anode of the gaseous tube to the grid of the vacuum tube, a condenser connected directly between the anode and cathode of the gaseous tube, means for establishing normal steady anode-cathode current through said vacuum tube including a resistor connected between the grid and cathode of said vacuum tube, means including said resistor for charging said condenser through said vacuum tube current, means for impressing a signal impulse upon the grid of said gaseous tube thereby producing discharge of said condenser through said tube and consequent reduction of the potential of the grid of the vacuum tube to cut off said normal current, and means responsive to the cut off of said vacuum tube current for producing an impulse, the time constant of said condenser and resistance being not substantially greater than $10^{-5}$ of a second.

3. An impulse repeating circuit comprising a gaseous tube and a vacuum tube each having cathode, anode and grid electrodes and circuits associated therewith including a condenser connected directly between the anode and cathode of the gaseous tube to provide the sole source of anode-cathode potential for the gaseous tube, means for establishing normal steady anode-cathode current through said vacuum tube, means including part of said last-named means for charging said condenser by said vacuum tube current, means connecting said condenser to the grid of said vacuum tube, means for impressing a signal impulse upon the cathode-grid circuit of the gaseous tube whereby the resistance of its anode-cathode circuit is reduced substantially to zero producing discharge of the condenser and consequent lowering of the potential of the grid of the vacuum tube to cut off the anode-cathode current of the vacuum tube, means responsive to rapid change in said vacuum tube current for producing an impulse and means for restoring said normal vacuum tube current and thereby recharging said condenser.

KENNETH FREDERICK HAINES.